R. NICHOLLS.
Organ Pneumatic-Action.

No. 159,705.

Patented Feb. 9, 1875.

UNITED STATES PATENT OFFICE.

REUBEN NICHOLLS, OF PHILADELPHIA, PENNSYLVANIA.

IMPROVEMENT IN ORGAN PNEUMATIC ACTIONS.

Specification forming part of Letters Patent No. 159,705, dated February 9, 1875; application filed August 24, 1874.

*To all whom it may concern:*

Be it known that I, REUBEN NICHOLLS, of Philadelphia, in the county of Philadelphia and State of Pennsylvania, have invented a new and useful Improvement in Pneumatic Key-Action; and I do hereby declare the following to be a full, clear, and exact description of the same, reference being had to the accompanying drawings, in which—

Figure 1:
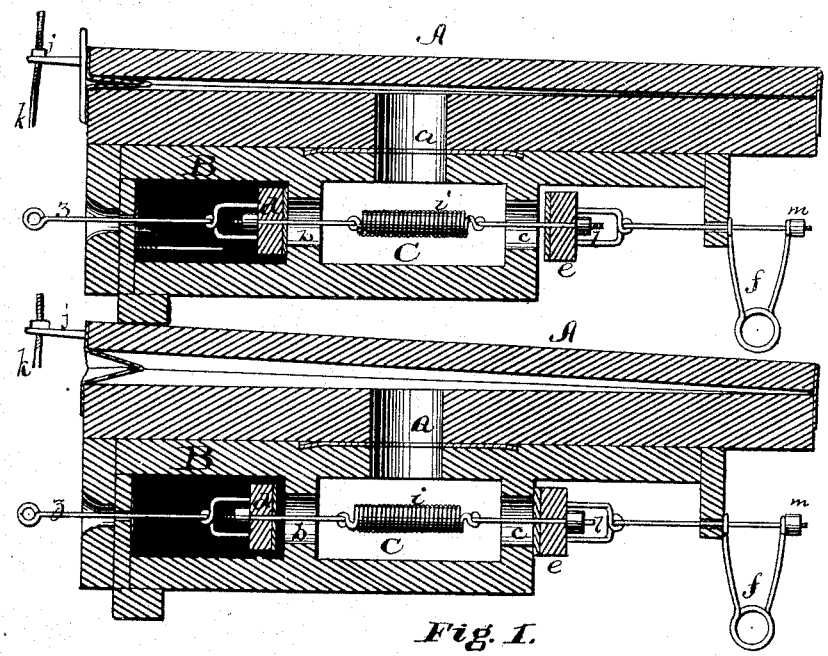
Figure 2:
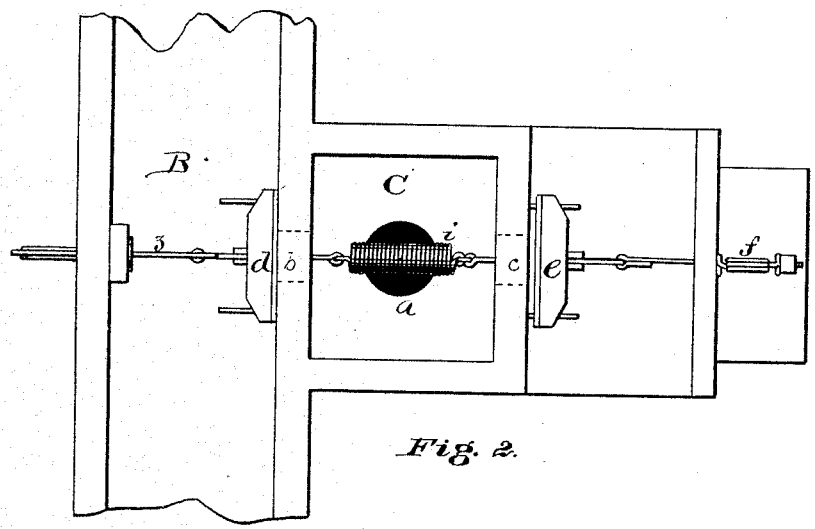

Figure 1 is a longitudinal section of my invention in position. Fig. 2 is a sectional plan of the same from the bottom.

This invention relates to an improvement in pneumatic key-actions, whereby the action is simplified, rendered more compact than heretofore, and the employment of back-falls, stickers, and trackers avoided.

Pipes of various sizes require correspondingly various volumes of wind, and where the pallets in the main wind-chest are operated directly by the key-action, the touch will necessarily vary in accordance with the volumes of wind pressing upon said pallets.

To obviate this inequality pneumatic actions have been employed consisting of small bellows having pallets uniform in size, and, therefore, opening against uniform pressure. These small bellows are known in the trade as pneumatics, and each one, being operated by its appropriate key, is also connected with its appropriate pallet in the main wind-chest, and its depression, when the key is depressed, effects the opening of said pallet in the main wind-chest, and admission of wind to the proper pipe or pipes.

My invention consists, first, in a small wind-chest for each pneumatic, with the inlet and outlet pallets therefor placed outside of said wind-chest, and connected together so that as the one is opened the other will be closed, whereby the opening and closing of said pallets may be effected by a single movement in one line; second, in a differential spring, placed between said pallets, and transmitting the motion of the one to the other, whereby the inlet-pallet may move through a greater distance than the outlet-pallet.

That others may fully understand my invention, I will particularly describe it.

A A are the pneumatics, placed side by side upon the wind-chests B B, in the manner described in my patent dated May 19, 1874, No. 150,972, so that each may be separately withdrawn and removed whenever required for repair or other purpose. Each pneumatic is provided with a small wind-chest, C, which has three passages, $a\ b\ c$, the first opening into the pneumatic A, the second into the wind-chest B, and the remaining one is an escape-passage opening to the exterior air. The two latter are in line with each other, and are covered by the pallets $d\ e$, located exteriorly to said wind-chest. The said pallets are connected together, and the pallet $e$ is also connected to a pallet-spring, $f$, the tension of which tends to keep the passage $b$ closed, and the passage $e$ open. The pallet $d$, which closes the passage $b$, is opened by a tracker, $z$, which passes through the wind-chest, and is actuated by the key-action, so that when the passage $b$ is unclosed, and wind admitted to inflate the pneumatic, the same movement closes the passage $c$, and when the pallet $d$ is released to close the passage $b$, the passage $c$ is automatically opened to permit the escape of the wind and collapse of the pneumatic.

In practice it is desirable that the key-action shall possess a certain degree of elasticity, and that the inlet-pallet $d$ should open farther than the outlet-pallet $e$, because the wind-inlet should be as far as possible unobstructed, so as to secure a quick action. I therefore place an elastic connection, $i$, between the pallets $d\ e$, so that after the pallet $e$ has closed the pallet $d$ may still continue to move away from its passage.

It is, of course, necessary that the tension of the spring $i$ should exceed that of the spring $f$; otherwise the passage $c$ would not be closed by the act of uncovering the passage $b$.

A small arm, $j$, projects from the top of the pneumatic for the attachment of the tracker $k$, which communicates with the pallet in the main wind-chest.

The pneumatics A A are arranged in series on separate wind-chests, one above another, and said wind-chests are so placed that the pneumatics have only room to rise a certain distance, and, therefore, overinflation is impossible.

None of the mechanism of the action is attached to the pneumatic, except the tracker $k$, and, therefore, when it is required to remove either of said pneumatics it is only necessary to detach the tracker $k$ before such removal.

The tension of the springs $f$ and $i$ may be adjusted by screw-buttons $l\ m$, as may be required.

Having described my invention, what I claim as new is—

1. The combination, with the pneumatic A and wind-chest B, of the wind-chest C, provided with the holes $b\ c$, and the pallets $d\ e$, coupled together, so as to simultaneously open one of said holes and close the other by a single movement.

2. In combination with the wind-chest B, the wind-chest C, provided with holes $b\ c$, and the pallets $d\ e$, located outside of said wind-chest C, and coupled together, as set forth.

3. In combination with the pallets $d\ e$ and the tension-spring $f$, the differential spring $i$, for the purpose set forth.

4. The combination, with the pallets $d\ e$ and springs $f\ i$, of the tracker $g$, whereby motion is transmitted from the key-action, substantially as set forth.

REUBEN NICHOLLS.

Witnesses:
   E. B. LONG,
   WM. H. WRIGHT.